S. TROOD.
HEATING APPARATUS.
APPLICATION FILED SEPT. 9, 1920.
1,413,203.
Patented Apr. 18, 1922.
3 SHEETS—SHEET 1.
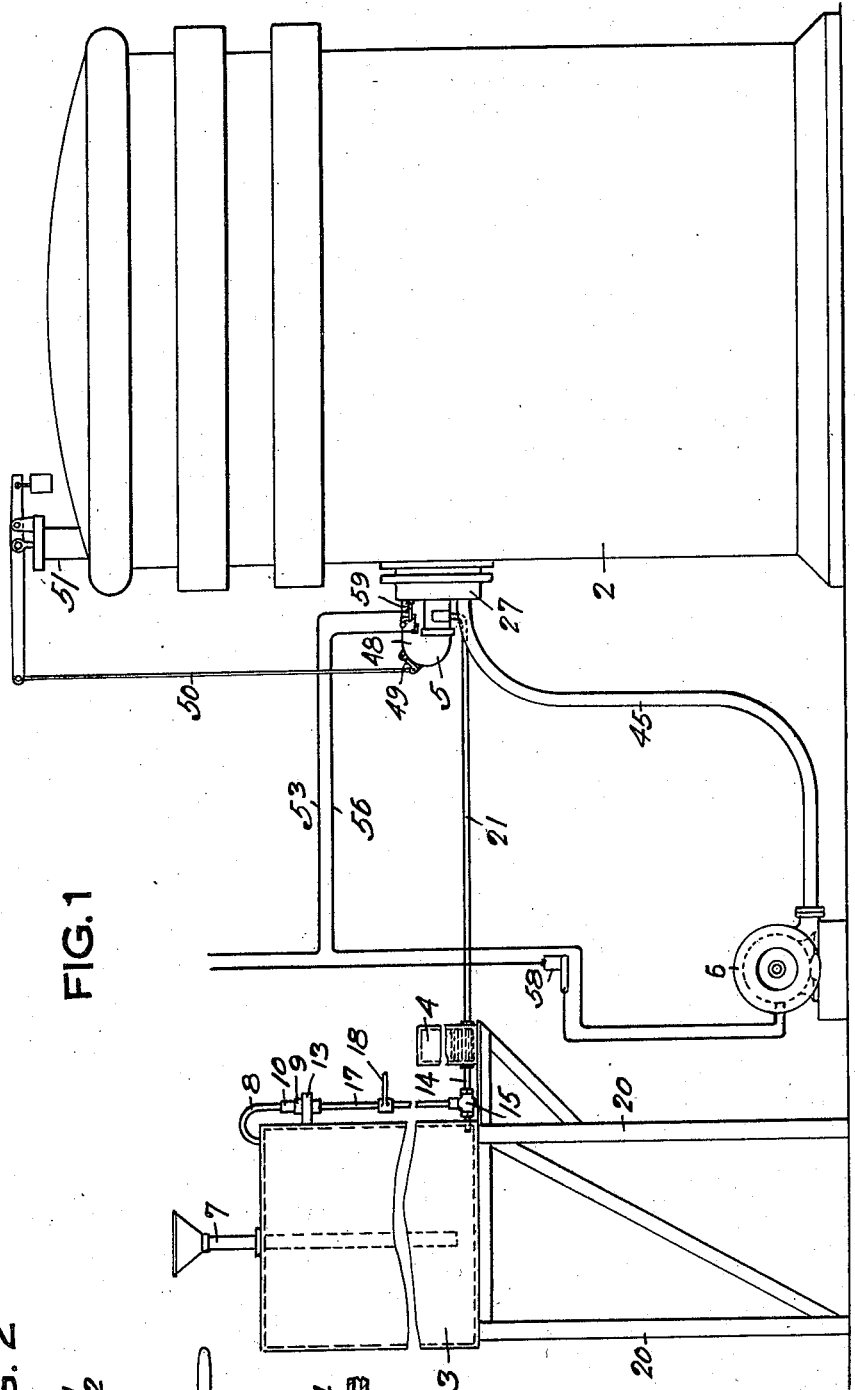
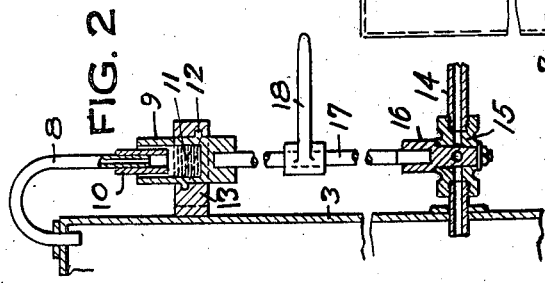
INVENTOR
Samuel Trood,
By Kay, Totten & Brown,
Attorneys

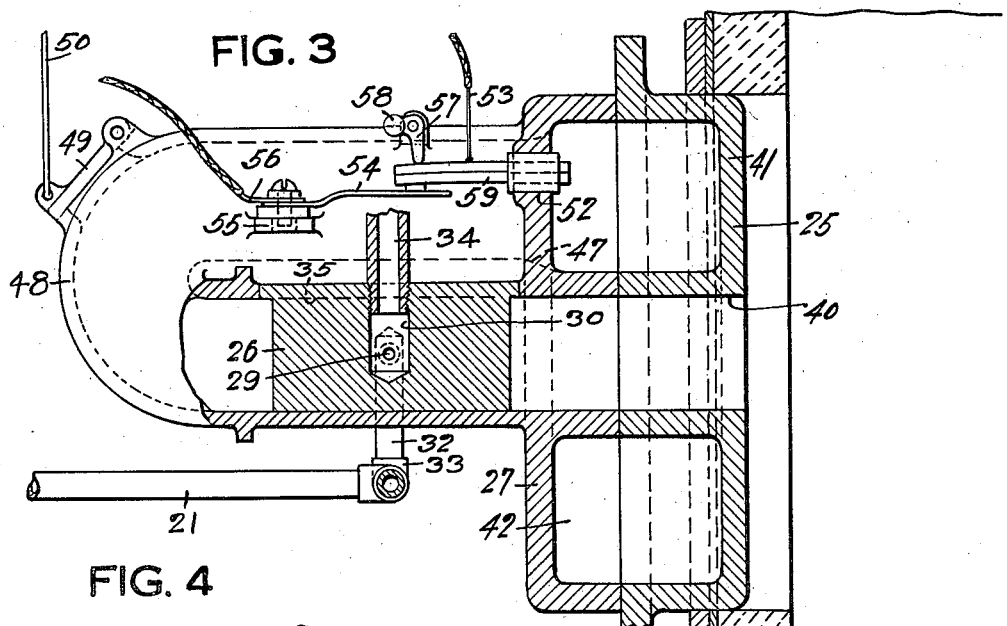
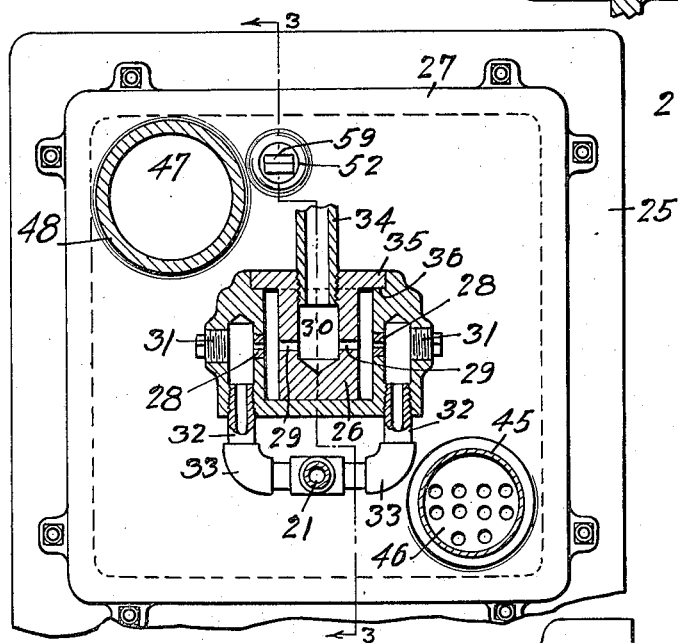
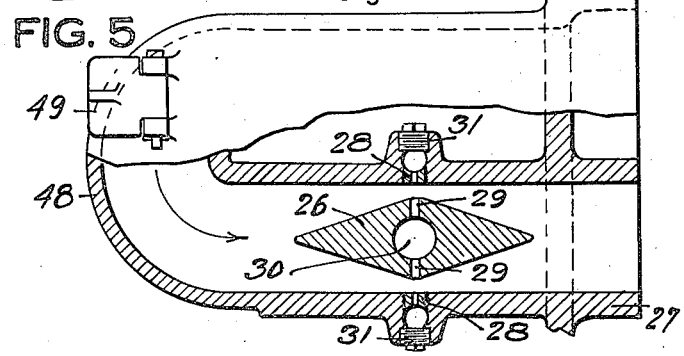
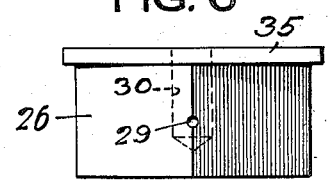
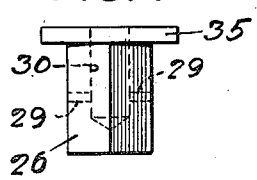

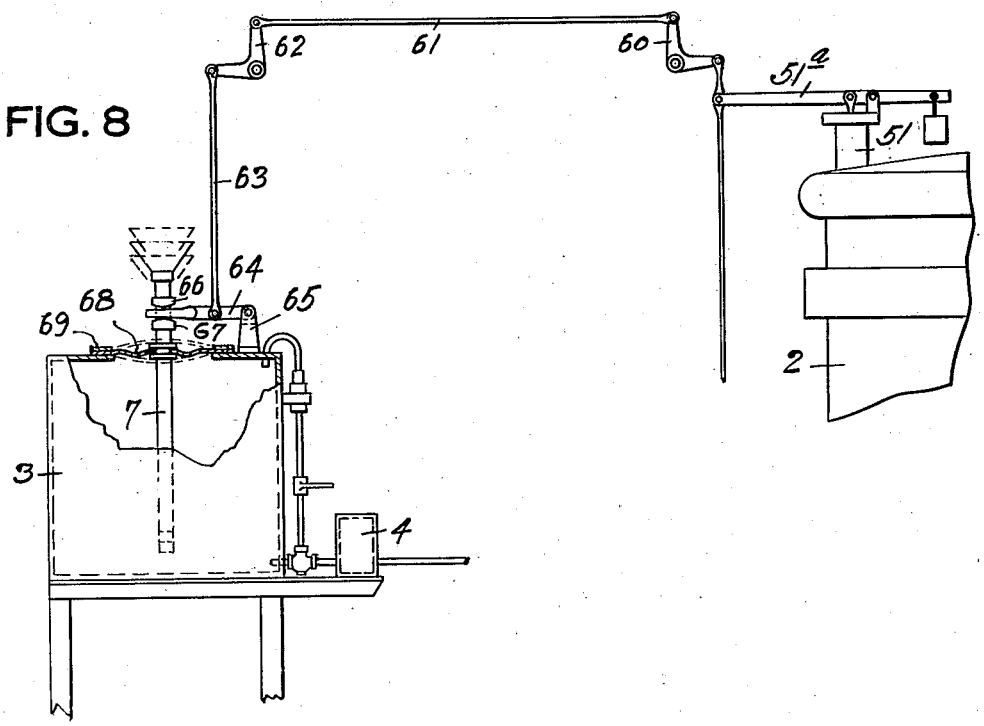
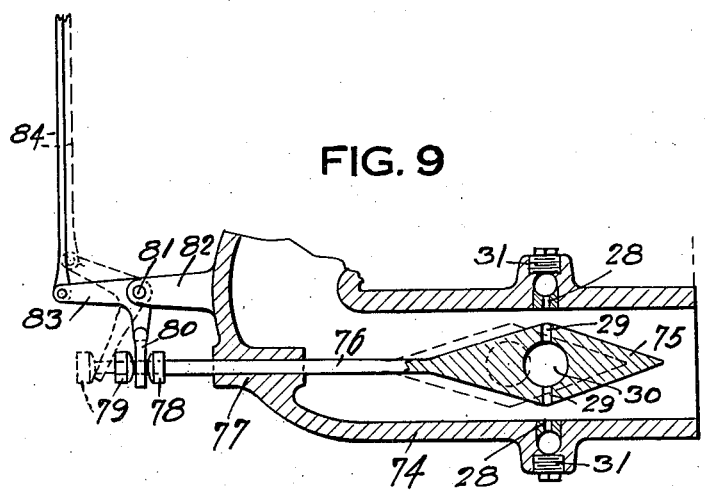

UNITED STATES PATENT OFFICE.

SAMUEL TROOD, OF PITTSBURGH, PENNSYLVANIA.

HEATING APPARATUS.

1,413,203.  Specification of Letters Patent.  Patented Apr. 18, 1922.

Application filed September 9, 1920. Serial No. 409,194.

*To all whom it may concern:*

Be it known that I, SAMUEL TROOD, a citizen of the United States, and resident of Pittsburgh, in the county of Allegheny and State of Pennsylvania, have invented a new and useful Improvement in Heating Apparatus; and I do hereby declare the following to be a full, clear, and exact description thereof.

My invention relates to apparatus for burning liquid and gaseous fuels and it has for its object to provide economical and satisfactory apparatus for home heating and for similar purposes.

More especially, my invention aims to provide a domestic heating equipment which will operate satisfactorily to burn heavy fuel oils, either with or without the additional use of gas.

As our resources of natural gas become exhausted, the problem of heating dwelling houses becomes more and more acute, especially in regions where coal, the ordinary alternative fuel to natural gas, is either not available or is objected to on account of its dirt and the care required in transporting, storing and stoking it and in the removal of ashes. Also, heating installations which are equipped for natural gas require expensive changes to adapt them for use with coal and in many systems an entire new furnace is required. These facts will make the average house heater seek for some other fuel and he will even be willing to pay a premium for escaping the above troubles.

There are two other fuels adapted for use in domestic heating. The first of these, manufactured gas, is ordinarily out of the question on account of its high cost, and the second available fuel is oil. This may range from the more expensive petroleum-base kerosene down to the heavier fuel oils, all of which are available for domestic heating provided that they are freely-flowing oils and are therefore adapted for convenient handling and for use in a simple burner system.

My present system is constructed in view of the foregoing considerations and comprises a furnace, which may be of any existing type, to which is applied a burner of simple and novel construction fed with oil or gas or with both kinds of fuel, the oil supply being contained in a tank operating to deliver the oil by gravity to the burner but at a point below the level of the burner intake. This prevents the oil from flowing into the burner and into the furnace when the system is not in operation. Suitable arrangements are provided for regulating the supply of air at the burner and also for regulating the electric circuit which controls the blower, so that when the flame at the burner is extinguished, either intentionally or accidentally, the blower will be stopped and will not be set in motion again until a switch is manually closed.

For a further understanding of my invention reference may be had to the accompanying drawings, in which Fig. 1 is a side elevational view, with parts in section, showing somewhat diagrammatically a system constructed in accordance with my invention; Fig. 2 is a vertical sectional view of the mercury seal with which the oil tank is provided; Fig. 3 is a longitudinal vertical sectional view of the burner, the section being taken substantially along the line 3—3, Fig. 4; Fig. 4 is a transverse vertical sectional view, the section being taken on the line 4—4, Fig. 3; Fig. 5 is a horizontal sectional view, the section being taken on the line 5—5, Fig. 4; Fig. 6 is a side elevational view of the diamond employed in the burner; Fig. 7 is an end elevational view of the diamond; and Figs. 8 and 9 are partial sectional views showing modified methods of regulation.

In the system shown in Fig. 1 of the drawing, the furnace 2 is provided with a combustion system having four interrelated parts, a main fuel tank 3, an auxiliary fuel tank 4, a burner 5 and an air blower 6. The main tank 3 and the auxiliary tank 4 operate on the principle of the ordinary student lamp, the main tank 3 being closed air-tight except for an air and filling pipe 7 and a vent pipe 8 which is normally closed by means of a mercury seal 9. The pipe 7, in this modification of the system, is preferably welded into the tank to prevent air from entering at the joint and the vent pipe 8 is provided to permit the escape of air while the tank is being filled.

The pipe 8 is normally closed by means of a mercury seal 9, the construction of which is shown in detail in Fig. 2. As shown, the seal consists of a cup fitting slidably around a sleeve 10 secured to the lower end of the vent pipe 8, the cup 9 containing a supply of mercury as shown at 11. A flange 12, suitably in the form of a triple-lead screw thread, is formed on the outside of the member 9 and is received in a correspondingly shaped groove in a bracket 13 attached to the outside of the main tank 3. The main tank 3 communicates with the auxiliary tank 4 by means of a pipe 14 in which is inserted a valve 15. The plug 16 of this valve has a recess in which is received the squared lower end of a vertical rod 17, the upper end of which is secured to the member 9 of the mercury seal. A handle 18 is provided for turning the rod 17. When it is desired to open the vent pipe 8 for the purpose of filling the tank 3, the rod 17 is turned by means of the handle 18 to close the valve 15 and this turning movement of the rod also opens the mercury seal, since the flange 12 of the seal member 9 follows the thread formed in the bracket 13. The tank system is thus entirely "fool-proof" since the interlocked valve and mercury seal insure that the auxiliary tank 4 cannot be flooded while filling the main tank.

The tanks 3 and 4 are mounted on suitable supports 20 which are of such height that the outlet pipe 21 from the auxiliary tank 4 is below the burner 5, while the level of the oil in the tank 4, which is determined by the position of the lower end of the filling pipe 7 in the main tank, is one or two inches below the level of the oil inlet to the burner. This arrangement is provided so that the oil will not flow into the burner by gravity but must be drawn in by suction.

The burner 5 forms the subject matter of my copending application for Letters Patent, Serial No. 410,350, filed Sept. 14, 1920, and is not specifically claimed herein but is shown and described in order to illustrate the system completely. As best shown in Figs. 3 to 7, this burner consists of three main parts, a back casting 25, a diamond 26, and a main or outer casting 27. The diamond 26 and the main casting 27 are so arranged as to form a double Venturi tube, as best shown in Fig. 5, a supply of air being blown past the diamond from the left, as indicated by the arrow in Fig. 5, and exerting a suction at the throat of each passage on the familiar principle of the Venturi tube. The fuel oil is supplied at the throats of the Venturi passages through oil tips 28 which are made removable in order that tips of different sizes may be provided for different kinds of oil and also to allow access to the gas holes 29 and 30 of the diamond through plugs 31 which are placed directly back of the oil tips. Oil is supplied to the oil tips 28 through short pipes 32 connected by means of elbows 33 to the oil line 21 while gas is supplied to the central hole 30 in the diamond through a pipe 34 leading to a suitable source of gas, not shown. As a measure of precaution against overheating of the oil supply, the oil inlet pipes 32 are placed on the outside of the burner casting and as far as possible from the heated portions of the casting.

To facilitate casting and assembly, the diamond 26 is made removable and one of its several possible forms is shown in Figs. 6 and 7, where the gas openings 29 and 30 are indicated in dotted lines and an upper flange is shown at 35 for supporting the diamond on a suitable ledge 36 formed in the main casting 27, as shown in Fig. 4. The main casting 27 is bolted to the back casting 25 which has an opening 40 in line with the diamond 26.

The blower 6 has its outlet connected by means of a pipe 45 to an air inlet 46 formed in the main casting 27. The air entering through the opening 46 passes through the box formed by the castings 25 and 27 and is brought out through an opening 47 into a goose-neck 48 which directs the air into the Venturi passages formed by the diamond 26 in the manner described above, after which the air currents, carrying the oil which they have drawn through the oil tips 28, are directed across each other and thoroughly mixed before entering the furnace.

A relief valve 49 is provided in the gooseneck 48 and is connected by means of a wire or cord 50 to a control mechanism 51 which may be the ordinary thermostatic control which is commonly employed to regulate furnace dampers.

The apparatus as thus far described will work without further attachments, but if the flame should go out the oil would still be sucked into the furnace and would accumulate there. To make such an occurrence impossible a thermostat 59 is placed in the path of the heated air, being suitably introduced through an opening 52 in the casting 27. This thermostat is connected to one of the lead wires 53 for the motor of the blower 6, and is adapted to engage a spring contact member 54, suitably of brass, which is attached by means of a binding post 55 to the lead wire 56 of the blower motor. A safety catch 57, provided with a weight 58 at one side, is mounted adjacent to the thermostat 59 and when the catch 57 is turned it forces the thermostat 59 against the contact finger 54 and so closes the circuit through the motor which operates the blower. Thereafter, the heated air causes the thermostat to distort still further in the direction in which it was forced by the catch, which allows the catch to drop back into its running position, in which it is detached from the thermostat. As the distortion of the thermostat is against spring metal, there is little opposition to its movement. If the flame should go out the thermostat will cool and will straighten itself, thus becoming detached from the contact member 54 and so breaking the electric circuit and stopping the blower.

In order to provide a safeguard against momentary stoppage of current in the electric circuit, which might extinguish the flame and then start the blower again, I provide a magnet switch 58, Fig. 1, which operates to hold the circuit closed as long as current is flowing but will permanently break the circuit upon any stoppage of current.

Figs. 8 and 9 show alternative methods of regulating the flame at the burner in order to produce the required amount of heat. The modification shown in Fig. 8 depends upon varying the vertical position of the filler tube 7 of the main tank, thereby changing the level of the oil at the burner and so changing the amount of oil consumed, while the arrangement of Fig. 9 depends upon varying the position of the throat of the Venturi passage through the burner, thereby altering the pressure at the oil inlet and so changing the amount of oil drawn into the furnace. Both of these devices are controlled by the regulator 51 which, as stated above, is of ordinary form and operates in response to the temperature in the room that is being heated.

In the device shown in Fig. 8 the counterweighted lever arm 51$^a$ of the regulator 51 is connected by means of a bell crank 60, a horizontal link 61, a second bell crank 62, and a vertical link 63, to a fork 64 which is pivotally secured to a bracket 65 on the top of the main fuel tank 3. The bifurcated end of the fork 64 encloses the filling pipe 7 between collars 66 and 67 secured to the filling pipe. The pipe 7, instead of being welded rigidly into the tank 3, as in Fig. 1, is attached to the tank by means of a circular flexible diaphragm 68 which is clamped to the top of the tank by means of a ring 69. This arrangement permits the filling pipe 7 to rise or descend between the dotted-line positions shown on Fig. 8.

In operation, the regulator 51, when the heat delivered by the furnace is to be reduced, operates to raise the free end of the arm 51$^a$, thus moving the link 61 to the left and lowering the link 63 and the fork 64 which carries the filling pipe 7 into its lowered position. This establishes a new liquid level in the auxiliary tank 4 and correspondingly reduces the level of the oil at the burner inlets, so that while the amount of air delivered by the blower remains constant, it carries with it a smaller quantity of oil and therefore the heat produced by the flame is correspondingly reduced.

In the modification shown in Fig. 9 the portion of the burner adjacent to the oil tips 28 consists of a circular tube 74 within which is a member 75 corresponding in function to the diamond 26 in Figs. 3 to 7, and having corresponding gas openings 29 and 30. The member 75, however, is circular in cross-section and has the form of two cones connected at their bases. The Venturi passage produced by the member 75 and the circular tube 73 is therefore of annular form. The member 75 is supported by a horizontal rod 76 which extends slidably through a bearing 77 and carries at its outer end two spaced collars 78 and 79 between which is disposed the forked end 80 of a bell crank lever which is pivoted at 81 to a bracket 82 and has its arm 83 attached pivotally to the lower end of a vertical rod 84, the upper end of which is pivotally secured to the outer end of the lever arm 51$^a$ of the regulator 51.

The modification shown in Fig. 9 is operated as in the modification of Fig. 8 by the vertical movement of the lever arm 51$^a$ which acts through the rod 54 to rock the bell crank lever 83 around its pivot and so to move the rod 76 lengthwise in its bearing 77. This moves the member 75 and so changes the position of the throat of the Venturi passage. When, for example, the member 75 is moved from its full-line position to its dotted-line position as shown in Fig. 9, the throat of the tube is changed from a position opposite to the oil tips 28 to a position further to the left in Fig. 9. The maximum suction through the Venturi tube is therefore exerted at one side of the oil tips and a smaller quantity of oil is therefore sucked into the burner by a given quantity of air. The reduction in the amount of fuel introduced into the burner reduces the heat delivered by the furnace, and thus causes the regulator 51 to operate, through the connections described, to move the member 75 back to its starting position where the Venturi throat is opposite to the oil tips 28, whereupon the original amount of oil is sucked into the burner and the heat is correspondingly increased.

It will be evident from the foregoing description that I have provided three separate means for automatically regulating the amount of fuel delivered to the burner, which regulation is effected in the first case by varying the amount of air, in the second case by varying the amount of fuel, and in the third case by varying the position of the point of maximum suction in the burner. Any one of these three regulating means may be employed as circumstances may require or as may be convenient.

In the operation of the system described above, the oil flows by gravity from the main tank 3 into the auxiliary tank 4, which should contain about one half gallon of oil in order that the system need not be shut down while the main tank is being filled. Thence it flows by gravity to a point adjacent to the burner 5 but below the oil inlet. The air from the blower 6 enters the burner casting and is heated to about 450° F., after which it passes through the goose-neck 48 and through the Venturi passage. The hot air passing through the passages vaporizes the oil and thus insures its atomization, and the two Venturi passages direct their flow across each other, as best shown in Fig. 5, thus insuring a thorough mixture of the gases. This use of the two Venturi passages in such a manner that they direct their flow across each other is a feature of special advantage in this system, and insures that the gases are prepared for proper combustion.

The apparatus may be started by gas, which is fed to the burner through the pipe 34, and the oil feed may be started after the burner is heated. It is quite possible, however, to start the furnace with the oil itself, and to use no gas at all.

If the furnace becomes too hot, the control device 51 will operate the fuel regulator, three of the many possible forms of which have been described above, and will automatically reduce the amount of fuel consumed. This may be accomplished in many ways other than those which I have shown and described, such for example as by the provision of a valve in the oil line operated by the control device according to the well known principle of the steam throttle valve, the valve employed in instantaneous water heaters, and the like.

Automatic stoppage of the fuel flow is also provided for by the thermostatic contact member 59, which operates in the manner described above to stop the blower and consequently the flow of fuel if the flame at the burner should be extinguished.

The system which I have shown and described may be set up complete and then applied to any existing form of furnace. It is therefore well adapted for use in connection with old coal and gas furnaces as well as for use with new equipments.

It is to be understood that the structural details which I have shown and described may be modified in many respects without departing from my invention and I therefore desire that no limitations be imposed upon my invention except such as are indicated in the appended claims.

I claim as my invention:

1. Heating apparatus comprising a substantially closed fuel tank, a burner adapted to receive fuel from the said tank, and interlocked means for shutting off the flow of fuel from the said tank and for simultaneously opening the said tank to the air.

2. Heating apparatus comprising a source of liquid fuel and a burner for receivng fuel therefrom, the said fuel source comprising a closed main tank, an auxiliary tank communicating therewith, a filling tube extending into the said main tank and having its inner end disposed at a predetermined distance above the bottom of the tank, a tube for opening the interior of the said tank to the outer air, a seal for normally closing the said tube, and means for simultaneously opening the said seal and closing communication between the said main tank and the said auxiliary tank.

3. Heating apparatus comprising a closed main fuel tank, an auxiliary fuel tank, a pipe connecting the bottom of the said main tank with the bottom of the said auxiliary tank, a valve for controlling the said pipe, a filling pipe extended into the said main tank and having its inner end a predetermined distance above the bottom of the said tank, a vent pipe extending into the top of the said main tank, a mercury seal for closing the end of the said vent pipe, and means for opening the said seal and for simultaneously closing the said valve.

4. Heating apparatus comprising a closed main fuel tank, an auxiliary fuel tank, a pipe connecting the bottom of the said main tank to the bottom of the said auxiliary tank, a valve for controlling the said pipe, a filling pipe extending into the said main tank, a vent pipe also extending into the said main tank, a mercury seal for closing the outer end of the said vent pipe, a bracket for supporting the said mercury seal, a support having an inclined surface for supporting the said bracket and means for connecting the said support and the said valve, whereby when the said support is turned to withdraw the said mercury seal from the said vent pipe, the said valve is simultaneously closed and when the said mercury seal is returned to close the said vent pipe, the said valve is simultaneously opened.

5. Heating apparatus comprising a burner, a blower for supplying air to the said burner, an electric motor for driving the said blower and circuit connections for the said motor comprising a flexible contact member, a thermostat disposed adjacent to the said burner and adapted, when heated, to bend toward the said flexible contact member, and a safety catch adapted to initially force the said thermostatic contact member into contact with the said flexible contact member and adapted to return to its starting position when the said thermostatic contact member is heated and bends farther toward the said flexible contact member, whereby when the thermostatic member cools it may withdraw from the said flexible contact member.

6. Heating apparatus comprising a source of liquid fuel and a burner for receiving fuel therefrom, said fuel source comprising a closed main tank, an auxiliary tank communicating therewith, means for opening the interior of the tank to the outer air, a seal for normally closing the said opening means, and means for simultaneously opening the said seal and closing communication between the said main tank and the said auxiliary tank.

7. Heating apparatus comprising a closed main fuel tank, an auxiliary fuel tank communicating with the said main tank, means for opening the interior of the said main tank to the outer air, a mercury seal for closing the said opening means, and means for opening the said seal and for simultaneously closing communication between the said main tank and the said auxiliary tank.

8. Heating apparatus comprising a closed main fuel tank, an auxiliary fuel tank communicating with the said main tank, a mercury seal for closing communication between the said tank and the outer air, a valve controlling the communication between the said main tank and the said auxiliary tank, an operating handle and connections whereby the said operating handle simultaneously opens said mercury seal and closes the said valve.

In testimony whereof I, the said SAMUEL TROOD, have hereunto set my hand.

SAMUEL TROOD.

Witnesses:
R. D. BROWN,
JOHN F. WILL.